(12) United States Patent
Matsubara

(10) Patent No.: US 10,192,306 B2
(45) Date of Patent: Jan. 29, 2019

(54) CELL RECOGNITION DEVICE, METHOD, AND PROGRAM

(71) Applicant: FUJIFILM Corporation, Tokyo (JP)

(72) Inventor: Kenta Matsubara, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 148 days.

(21) Appl. No.: 15/273,789

(22) Filed: Sep. 23, 2016

(65) Prior Publication Data

US 2017/0011512 A1    Jan. 12, 2017

Related U.S. Application Data

(63) Continuation of application No. PCT/JP2015/001458, filed on Mar. 17, 2015.

(30) Foreign Application Priority Data

Mar. 28, 2014  (JP) .................................. 2014-067874

(51) Int. Cl.
  *G06K 9/00* (2006.01)
  *G06T 7/00* (2017.01)
  *G06T 11/60* (2006.01)

(52) U.S. Cl.
  CPC ........ *G06T 7/0012* (2013.01); *G06K 9/00147* (2013.01); *G06T 11/60* (2013.01); *G06T 2207/30024* (2013.01)

(58) Field of Classification Search
  CPC ......... G06T 2207/30024; G06T 7/0012; G06T 7/11; G06K 9/00147; G06K 9/00127
  See application file for complete search history.

(56) References Cited

U.S. PATENT DOCUMENTS

| 2007/0124085 A1 | 5/2007 | Kalusche et al. |
| 2008/0166035 A1* | 7/2008 | Qian ............... G06T 7/0012 382/133 |
| 2010/0150423 A1 | 6/2010 | Hong et al. |

FOREIGN PATENT DOCUMENTS

| JP | 2001-285195 A | 10/2001 |
| JP | 2006-79196 A | 3/2006 |
| JP | 2007-192767 A | 8/2007 |
| JP | 2007-327928 A | 12/2007 |
| JP | 2012-511906 A | 5/2012 |

OTHER PUBLICATIONS

Ghanbari, Ali, et al. "Cell image recognition and visual servo control for automated cell injection." Autonomous Robots and Agents, 2009. ICARA 2009. 4th International Conference on. IEEE, 2009.*

(Continued)

*Primary Examiner* — Li Liu
(74) *Attorney, Agent, or Firm* — Birch, Stewart, Kolasch & Birch, LLP

(57) ABSTRACT

A nucleolus detection unit, which detects nucleoli in a plurality of cells in a cell image obtained by imaging the cells, and a cell recognition unit, which acquires information indicating a distance between the nucleoli and recognizes the individual cells based on the information indicating the distance, are provided.

9 Claims, 4 Drawing Sheets

(56) References Cited

OTHER PUBLICATIONS

Ponomarev, Gennady V., et al. "ANA HEp-2 cells image classification using number, size, shape and localization of targeted cell regions." Pattern Recognition 47.7 (2014): 2360-2366.*
International Search Report for PCT/JP2015/001458 dated Jun. 16, 2015.
Written Opinion of the International Searching Authority for PCT/JP2015/001458 dated Jun. 16, 2015.

* cited by examiner

CELL RECOGNITION DEVICE, METHOD, AND PROGRAM

CROSS REFERENCE TO RELATED APPLICATIONS

The present application is a Continuation of PCT International Application No. PCT/JP2015/001458 filed on Mar. 17, 2015, which claims priority under 35 U.S.C. § 119(a) to Japanese Patent Application No. 2014-067874 filed on Mar. 28, 2014. Each of the above applications is hereby expressly incorporated by reference, in its entirety, into the present application.

BACKGROUND OF THE INVENTION

1. Field of the Invention

The present invention relates to a cell recognition device, method, and program for recognizing the regions of individual cells in a cell image obtained by imaging a plurality of cells.

2. Description of the Related Art

Conventionally, a method of imaging pluripotent stem cells such as ES cells and iPS cells, differentiation-induced cells, or the like using a microscope and evaluating the culture state of cells by ascertaining the features of the image has been proposed.

For example, JP2007-327928A has proposed detecting the number of nucleoli in a cell image and determining the division cycle of cells based on the number of nucleoli.

Here, when imaging the cultured cells using a microscope as described above, there is a case where an image of dyed cells is captured. However, when evaluating cells, it may be important to observe undyed cells, or dyeing itself may have an adverse effect on cells.

In addition, when evaluating the state of cells from the cell image, it is important to accurately recognize individual cells included in the cell image.

SUMMARY OF THE INVENTION

However, for example, in a case where undyed cells have been imaged using a phase contrast microscope, it has been difficult to accurately recognize individual cells even though the nucleus, nucleolus, and cytoplasm in the cell image could be partially observed.

For example, nucleoli of individual cells in a cell image appear as high-contrast black grains as indicated by the arrows in FIG. 5. However, since it is not clear to which cell each nucleolus belongs, it is difficult to accurately recognize the regions of individual cells. In addition, for example, in the case of measuring the number of cells included in a cell image, even if only the nucleoli shown in FIG. 5 are recognized, it is not possible to accurately evaluate the number of individual cells just by measuring the number of nucleoli since there is a variation in the number of nucleoli included in one cell.

Although JP2007-327928A discloses detecting nucleoli, no proposals for accurately detecting the regions of individual cells have been made.

In view of the aforementioned problems, it is an object of the present invention to provide a cell recognition device, method, and program capable of accurately recognizing individual cells in a cell image obtained by imaging a plurality of cells.

A cell recognition device of the present invention comprises: a nucleolus detection unit that detects nucleoli in a plurality of cells in a cell image obtained by imaging the cells; and a cell recognition unit that acquires information indicating a distance between the nucleoli and recognizes the individual cells based on the information indicating the distance.

In the cell recognition device of the present invention described above, the cell recognition unit can acquire information indicating sizes of the nucleoli and recognize the individual cells based on the information indicating the sizes and the information indicating the distance.

The cell recognition unit can acquire brightness information of the cell image, recognize a boundary of the individual cells based on the brightness information, and recognize the individual cells based on information of the recognized boundary and the information indicating the distance.

It is possible to further comprise a cell information acquisition unit that acquires the number of cells included in the cell image, the number of cells per unit area, or a cell density distribution based on the individual cells recognized by the cell recognition unit.

It is possible to further comprise a mapping unit that maps the cell density distribution.

It is possible to further comprise a display control unit that displays the mapped image so as to be superimposed on the cell image.

The cell recognition unit can recognize a nucleolus group, for which the distance between the nucleoli is equal to or less than a threshold value, as belonging to the same cell.

The cell recognition unit can change the threshold value according to a size of each of the nucleoli.

The cell recognition unit can set regions having center-of-gravity positions of the nucleoli, which are recognized as belonging to the same cell, as centers, and recognize a region of one cell based on the set regions.

A cell recognition method of the present invention includes: detecting nucleoli in a plurality of cells in a cell image obtained by imaging the cells; and acquiring information indicating a distance between the nucleoli and recognizing the individual cells based on the information indicating the distance.

A cell recognition program of the present invention causes a computer to function as: a nucleolus detection unit that detects nucleoli in a plurality of cells in a cell image obtained by imaging the cells; and a cell recognition unit that acquires information indicating a distance between the nucleoli and recognizes the individual cells based on the information indicating the distance.

According to the cell recognition device, method, and program of the present invention, nucleoli in a plurality of cells are detected in a cell image obtained by imaging the cells, information indicating the distance between the nucleoli is acquired, and the individual cells are recognized based on the information indicating the distance. Therefore, since a nucleolus group belonging to the same cell can be determined with high accuracy, it is possible to recognize individual cell regions with high accuracy.

DESCRIPTION OF THE PREFERRED EMBODIMENTS

Figure 1:
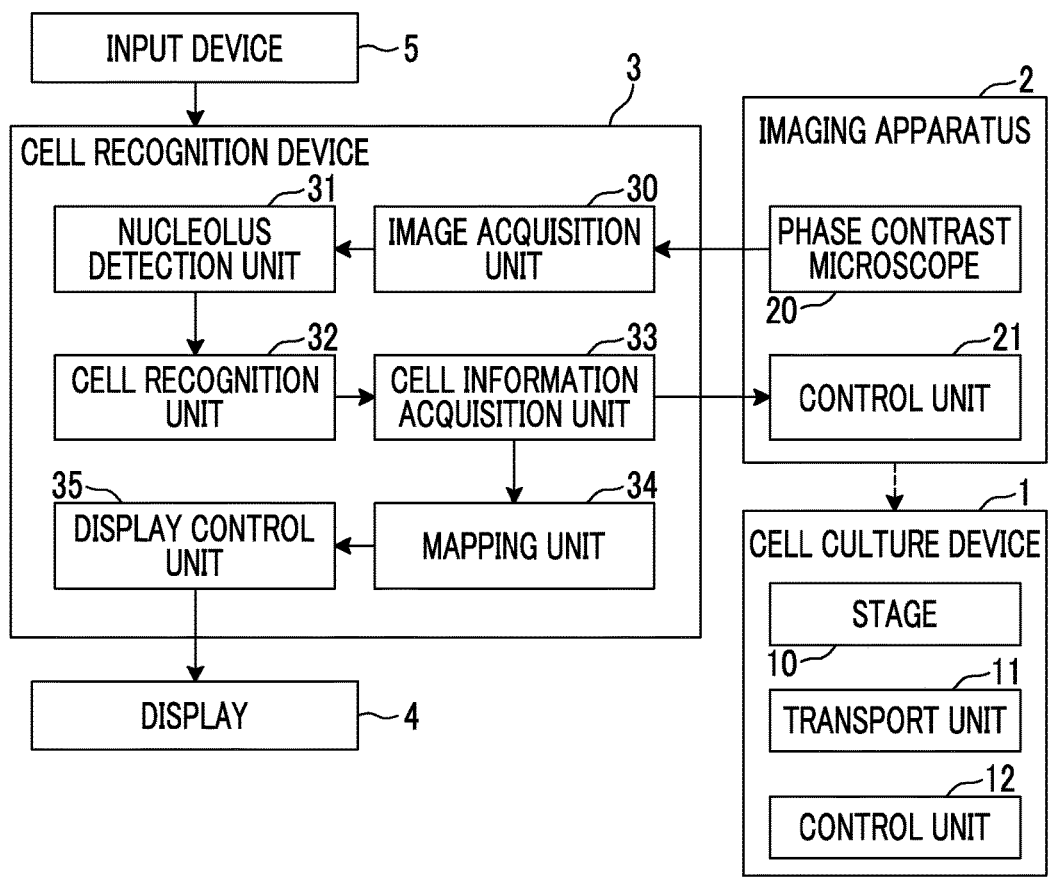
FIG. 1 is a block diagram showing the schematic configuration of a cell culture observation system using an embodiment of a cell recognition device of the present invention.

Hereinafter, a cell culture observation system using an embodiment of a cell recognition device, method, and program of the present invention will be described in detail with reference to the diagrams. Although the present invention has a feature in a method of recognizing individual cells in a cell image obtained by imaging cells, the overall configuration of the cell culture observation system of the present embodiment will be described first. FIG. 1 is a block diagram showing the schematic configuration of a cell culture observation system.

As shown in FIG. 1, the cell culture observation system of the present embodiment includes a cell culture device 1, an imaging device 2, a cell recognition device 3, a display 4, and an input device 5.

The cell culture device 1 is a device for culturing cells. As cells to be cultured, for example, there are pluripotent stem cells such as iPS cells or ES cells, cells of nerves, skin, myocardium, or liver that are differentiation-induced from stem cells, and cancer cells. In the cell culture device 1, a plurality of culture vessels are housed in which stem cells to be cultured are seeded on a culture medium. The cell culture device 1 includes a stage 10, a transport unit 11, and a control unit 12.

On the stage 10, a culture vessel to be imaged by the imaging device 2 is placed. The transport unit 11 selects a culture vessel to be imaged from a plurality of culture vessels housed in a predetermined position in the cell culture device 1, and transports the selected culture vessel to the stage 10. The control unit 12 controls the entire cell culture device 1, and controls not only the operation of the stage 10 or the transport unit 11 but also environmental conditions, such as the temperature, humidity, and $CO_2$ concentration in the cell culture device 1. As the configuration for adjusting the temperature, humidity, and $CO_2$ concentration, it is possible to use a known configuration.

The imaging device 2 captures an image of the cell colony in the culture vessel placed on the stage 10. The imaging device 2 includes a phase contrast microscope 20 that images cell colonies and outputs a cell image and a control unit 21 that controls the phase contrast microscope 20.

The phase contrast microscope 20 includes an imaging element, such as a complementary metal-oxide semiconductor (CMOS) sensor or a charge-coupled device (CCD) sensor, and a cell image obtained by imaging cells is output from the imaging element. Although the phase contrast microscope is used in the present embodiment, for example, a bright field microscope or a differential interference microscope may also be used without being limited to the phase contrast microscope.

The control unit 21 controls the entire imaging device 2. Specifically, the control unit 21 controls the optical magnification of the phase contrast microscope 20, the exposure time or the resolution of the imaging element, the amount of exposure of an illumination light source, and the like.

The cell recognition device 3 is formed by installing an embodiment of a cell recognition program of the present invention in a computer.

The cell recognition device 3 includes a central processing unit, a semiconductor memory, a hard disk, and the like, and an embodiment of the cell recognition program of the present invention is installed in the hard disk. When the program is executed by the central processing unit, an image acquisition unit 30, a nucleolus detection unit 31, a cell recognition unit 32, a cell information acquisition unit 33, a mapping unit 34, and a display control unit 35 shown in FIG. 1 operate.

The image acquisition unit 30 acquires and stores a cell image of the cell colonies obtained by imaging of the imaging device 2. In the present embodiment, a cell image is obtained by performing imaging with the optical magnification of the phase contrast microscope 20 as 4× to 20×. For the optical magnification, optical magnification in the case of capturing a cell image used at the time of recognition of individual cells to be described later may be different from optical magnification in the case of capturing a cell image used when observing the appearance of cell colonies. Specifically, the optical magnification in the case of capturing a cell image used for the cell recognition may be changed to high magnification. The optical magnification may be changed automatically, or may be changed manually.

The cell image may be one image obtained by imaging one cell colony, or may be a group of a plurality of images obtained by dividing one cell colony into a plurality of rectangular regions. In addition, a plurality of cell colonies may be included in one image.

The image acquisition unit 30 stores identification information for identifying the cell colony and a cell image so as to match each other. For example, in a case where one cell colony is captured as one cell image, identification information of the cell colony and the cell image are stored so as to match each other in a one-to-one manner. In a case where one cell colony is captured as cell images of a plurality of regions, identification information of the cell colony and a group of the cell images of the plurality of regions are stored so as to match each other. In addition, in a case where a plurality of cell colonies are captured as one cell image, identification information of each of the cell colonies and one cell image are stored so as to match each other.

By storing and managing the identification information of each cell colony and a cell image so as to match each other as described above, for example, when a user inputs the identification information of the cell colony through the input device 5, it is possible to immediately read and display the cell image matched with the identification information.

The nucleolus detection unit 31 acquires a cell image read from the image acquisition unit 30, and detects nucleoli in the cell image. As a nucleolus detection method, for example, it is preferable to detect the edge of a nucleolus by performing filtering processing after converting a cell image to a binary image and detect the nucleolus by performing pattern matching for the edge. However, without being limited thereto, a nucleolus may also be detected by performing threshold value determination since the nucleolus appears as a high-contrast grain that is darker (black) than the surrounding area in the cell image. In addition, other various known methods can be used as the nucleolus detection method.

The cell recognition unit 32 acquires information indicating the distance between nucleoli detected by the nucleolus detection unit 31, and recognizes the regions of individual cells included in the cell image based on the information indicating the distance.

Here, the method of recognizing individual cells in the cell recognition unit 32 of the present embodiment will be described in detail.

First, the cell recognition unit 32 acquires information indicating the distance between nucleoli as described above. As the information indicating the distance, for example, it is preferable to acquire the shortest distance when connecting the nucleoli to each other in a straight line. Then, for each nucleolus, information indicating the distance between the nucleolus and all nucleoli other than the nucleolus is acquired.

Figure 2:
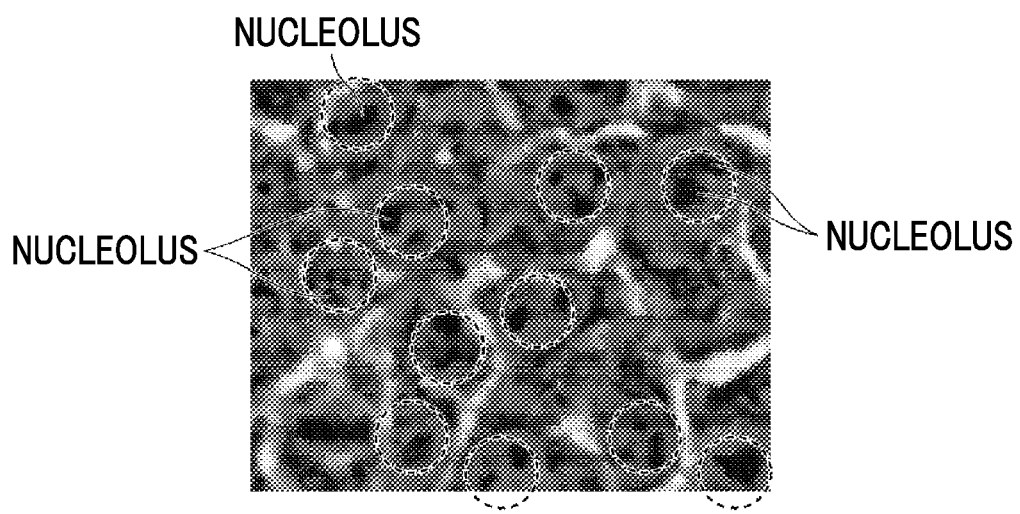
FIG. 2 is a diagram illustrating a nucleolus group expected to belong to the same cell.

Then, the cell recognition unit 32 determines whether or not the information indicating the distance acquired as described above is equal to or less than a threshold value set in advance, and recognizes that a nucleolus group, for which the information indicating the distance is equal to or less than the threshold value, belongs to the same cell. FIG. 2 shows an example of a cell image, and a portion darker (black) than the surrounding area is a nucleolus. In FIG. 2, a nucleolus group expected to belong to the same cell is surrounded with a dotted circle.

At this time, the threshold value described above may be changed based on the size of the nucleolus. That is, a nucleolus group belonging to the same cell may be recognized by acquiring information indicating the size of a nucleolus, setting the threshold value based on the information indicating the size, and comparing the threshold value with the information indicating the distance.

For example, the maximum diameter of the nucleolus may be acquired, and the maximum diameter may be set as the threshold value described above. Specifically, in a case where the maximum diameter of the nucleolus is 5 μm, nucleoli that are distant from the nucleolus 5 μm or less may be recognized as a nucleolus group belonging to the same cell. In a case where the maximum diameter of the nucleolus is 1 μm, nucleoli that are distant from the nucleolus 1 μm or less may be recognized as a nucleolus group belonging to the same cell. The size of the nucleolus is not limited to the maximum diameter described above. For example, an average diameter or a minimum diameter may also be used.

In addition, the information indicating the size of the nucleolus, such as the maximum diameter, the average diameter, or the minimum diameter, may be automatically measured from the cell image, and may be input by the user using the input device 5.

For each nucleolus, the threshold value described above may be set based on the size, or a statistical value, such as an average value, a maximum value, or a minimum value of the sizes of all nucleoli in a cell image, may be calculated and one threshold value may be set based on the statistical value.

In the case of setting a threshold value based on the size of each nucleolus, for example, in a case where the sizes of two nucleoli to be determined are greatly different, a case occurs in which a distance of the other cell when viewed from one cell is equal to or less than the threshold value but a distance of the one cell when viewed from the other cell is equal to or greater than the threshold value on the contrary. In this case, the two nucleoli may be recognized as nucleoli belonging to the same cell, or may be recognized as nucleoli that do not belong to the same cell.

Although the threshold value is changed according to the size of the nucleolus in the above explanation, the threshold value may also be changed, for example, according to the optical magnification of the phase contrast microscope 20. For example, the threshold value may be set to increase as the optical magnification increases, or a table in which the optical magnification and the threshold value are associated with each other may be set.

Figure 3:
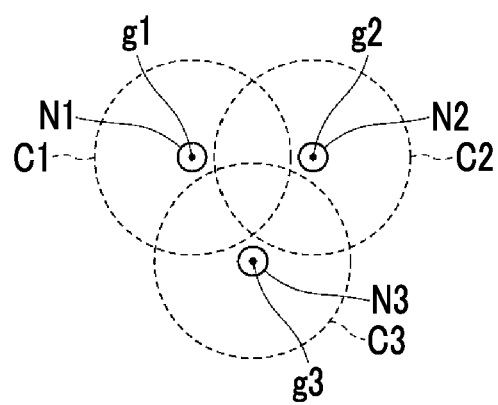
FIG. 3 is a diagram illustrating a method of recognizing the regions of individual cells.

Then, the cell recognition unit 32 recognizes a region of one cell based on the nucleolus group recognized as belonging to the same cell. Specifically, for example, in a case where the nucleolus group recognized as belonging to the same cell is nucleoli N1 to N3 shown in FIG. 3, circular regions C1 to C3 having center-of-gravity positions g1 to g3 of the nucleoli N1 to N3 as their centers are set, and a circular region that includes the circular regions C1 to C3 and has a minimum diameter is recognized as a region of one cell. Although the center-of-gravity position of each nucleolus is set as the center herein, other points on the nucleolus may also be set as the center without being limited thereto. In addition, although the circular region is set with the center-of-gravity position as a center herein, an elliptical region or a rectangular region may be set without being limited to the circular region.

In addition, in the above explanation, a circular region is set for each nucleolus. However, without being limited to this, for each nucleolus, an image of the surrounding area may be searched for, and respective regions having approximately the same contrast may be set. A circular region that includes regions having approximately the same contrast, which are set for respective nucleoli, and has a minimum diameter may be recognized as a region of one cell.

The range of contrast regarded as being approximately the same may be set in advance. In addition, since the contrast of a cell image changes depending on the optical magnification, an illumination light source, exposure time, the type of a microscope, or the like, the range of contrast regarded as being approximately the same may be changed and set based on these imaging conditions.

Returning to FIG. 1, the cell information acquisition unit 33 calculates the number of cells per unit area in a cell image, that is, a cell density, based on the regions of individual cells recognized by the cell recognition unit 32. The unit area may be one region obtained by dividing the cell colony into a plurality of rectangular regions or may be one region obtained by dividing the entire imaging region into a plurality of rectangular regions, for example. As the size of one rectangular region, it is preferable to set, for example, 50 μm×50 μm or 100 μm×100 μm.

The mapping unit 34 acquires a cell density distribution based on the cell density for each rectangular region of the unit area calculated by the cell information acquisition unit 33, and generates a cell density image by mapping the cell density distribution. It is preferable that the cell density image is, for example, an image in which different colors, different saturations, or different brightnesses are assigned to the respective rectangular regions of the unit area according to the magnitude of the cell density.

The display control unit 35 acquires the cell image read from the image acquisition unit 30 and acquires the cell density image generated by the mapping unit 34, and displays the cell image and the cell density image on the display 4 so as to be superimposed on each other. As the cell density image superimposed on the cell image, a translucent image that can be observed after passing through the cell image may be used, or an image may be used in which the outlines of respective rectangular regions having a unit area are expressed in different colors as described above.

The input device 5 includes a mouse, a keyboard, and the like, and receives a setting input from the user. For example, the input device 5 can receive a setting input of the imaging conditions, such as the optical magnification of the phase contrast microscope 20, or information indicating the size of the nucleolus described above.

Figure 4:
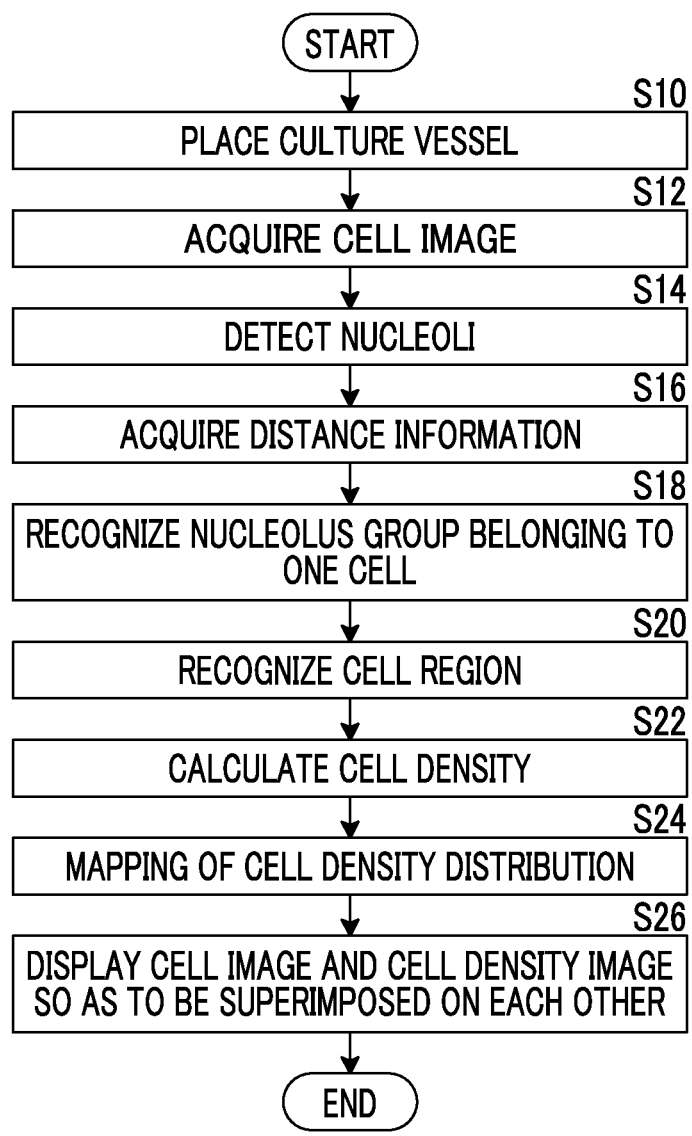
FIG. 4 is a flowchart illustrating the operation of the cell culture observation system using an embodiment of the cell recognition device of the present invention.
Figure 5:
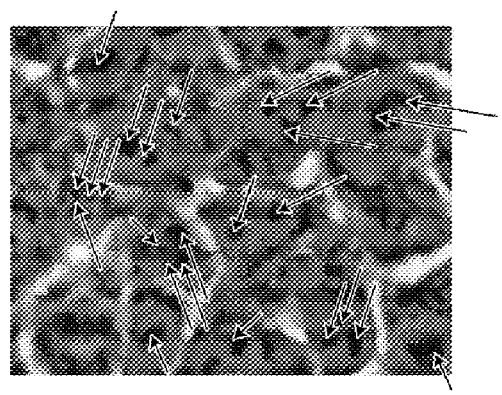
FIG. 5 is a diagram illustrating nucleoli in a cell image.

Next, the operation of the above-described cell culture observation system will be described with reference to the flowchart shown in FIG. 4.

First, in the cell culture device 1, the transport unit 11 selects a culture vessel to be imaged from a plurality of culture vessels housed therein, and places the selected culture vessel on the stage 10 (S10).

Then, an image of the cell colony in the culture vessel is captured by the phase contrast microscope 20 of the imaging device 2, and the captured cell image is acquired by the image acquisition unit 30 of the cell recognition device 3 (S12).

Then, the cell image acquired by the image acquisition unit 30 is read by the nucleolus detection unit 31, and nucleoli included in the cell image are detected by the nucleolus detection unit 31 (S14).

The nucleolus detection result in the nucleolus detection unit 31 is output to the cell recognition unit 32, and the cell recognition unit 32 acquires information indicating the distance between nucleoli based on the input nucleolus detection result (S16).

Then, the cell recognition unit 32 recognizes a nucleolus group belonging to the same cell based on the information indicating the distance between nucleoli as described above (S18), and recognizes individual cell regions based on the nucleolus group (S20).

The information of individual cell regions recognized by the cell recognition unit 32 is acquired by the cell information acquisition unit 33, and the cell information acquisition unit 33 calculates a cell density for each rectangular region of the unit area in the cell image based on the input information of individual cell regions (S22).

The cell density acquired by the cell information acquisition unit 33 is output to the mapping unit 34, and the mapping unit 34 generates a cell density image by mapping the cell density distribution (S24).

Then, the cell image acquired by the image acquisition unit 30 and the cell density image generated by the mapping unit 34 are output to the display control unit 35, and the display control unit 35 displays the cell image and the cell density image on the display 4 so that the cell density image is superimposed on the cell image (S26).

According to the cell culture observation system of the embodiment described above, nucleoli in a plurality of cells are detected in a cell image obtained by imaging the cells, information indicating the distance between the nucleoli is acquired, and the individual cells are recognized based on the information indicating the distance. Therefore, since a nucleolus group belonging to the same cell can be determined with high accuracy, it is possible to recognize individual cell regions with high accuracy.

In the cell culture observation system of the embodiment described above, a nucleolus group for which the distance between nucleoli is equal to or less than the threshold value is recognized as belonging to the same cell. However, for example, in a case where a nucleolus is located not in the center but in the peripheral portion of the cell, even nucleoli belonging to different cells may be erroneously recognized since the distance between the nucleolus is equal to or less than the threshold value.

Therefore, for example, brightness information of a cell image is acquired, and a high-brightness region, such as a halo appearing at a boundary between cells, is extracted. In a case where the high-brightness boundary region is present on a straight line connecting nucleoli to each other, even if the distance between the nucleoli is equal to or less than the threshold value, the nucleoli may be recognized as nucleoli belonging to different cells. The halo is high-brightness image signals generated when illumination light passes between cells.

In the cell culture observation system of the embodiment described above, the cell density is calculated based on the regions of individual cells recognized by the cell recognition unit 32, and the cell density image is generated by mapping the cell density distribution. However, without being limited to this, the number of cells per unit area or the number of cells included in a cell image may be simply counted, and the number of cells may be displayed in a text, such as a numeric value.

What is claimed is:

1. A cell recognition device, comprising:
   a processor configured to:
   detect nucleoli in a plurality of cells in a cell image obtained by imaging the cells; and
   acquire information indicating a distance between the nucleoli and recognizes the individual cells based on the information indicating the distance,
   wherein the processor is further configured to recognize a nucleolus group, for which the distance between the nucleoli is equal to or less than a threshold value, as belonging to the same cell, and
   wherein the processor is further configured to acquire brightness information of the cell image and recognize a boundary of the individual cells based on the brightness information, and in a case where a boundary region is present on a straight line connecting nucleoli to each other, even if the distance between the nucleoli is equal to or less than the threshold value, the nucleoli are recognized as nucleoli belonging to different cells.

2. The cell recognition device according to claim 1, wherein the processor is further configured to acquire information indicating sizes of the nucleoli, and recognize the individual cells based on the information indicating the sizes and the information indicating the distance.

3. The cell recognition device according to claim 1, wherein the processor is further configured to acquire the number of cells included in the cell image, the number of cells per unit area, or a cell density distribution based on the individual cells recognized by the processor.

4. The cell recognition device according to claim 3, wherein the processor is further configured to map the cell density distribution on a cell density image based on a cell density for each region of the unit area calculated by the processor,
   wherein different colors, different saturations, or different brightnesses are assigned to the respective regions according to a magnitude of the cell density in the cell image.

5. The cell recognition device according to claim 4, wherein the processor is further configured to display the mapped image so as to be superimposed on the cell image.

6. The cell recognition device according to claim 1, wherein the processor is further configured to change the threshold value according to a size of each of the nucleoli.

7. The cell recognition device according to claim 1, wherein the processor is further configured to set regions having center-of-gravity positions of the nucleoli, which are recognized as belonging to the same cell, as centers, and recognize a region of one cell based on the set regions.

8. A cell recognition method, comprising:
   detecting, via a processor, nucleoli in a plurality of cells in a cell image obtained by imaging the cells; and
   acquiring, via the processor, information indicating a distance between the nucleoli and recognizing the individual cells based on the information indicating the distance, the method further comprising:
   recognizing, via the processor, a nucleolus group, for which the distance between the nucleoli is equal to or less than a threshold value, as belonging to the same cell; and
   acquiring, via the processor, brightness information of the cell image and recognize a boundary of the individual cells based on the brightness information, and in a case where a boundary region is present on a straight line connecting nucleoli to each other, even if the distance between the nucleoli is equal to or less than the threshold value, the nucleoli are recognized as nucleoli belonging to different cells.

9. A non-transitory computer readable recording medium having a cell recognition program stored therein, executable by a processor, the cell recognition program causing a computer to:
   detect nucleoli in a plurality of cells in a cell image obtained by imaging the cells; and
   acquire information indicating a distance between the nucleoli and recognizes the individual cells based on the information indicating the distance, the cell recognition program further causing the computer to:
   recognize a nucleolus group, for which the distance between the nucleoli is equal to or less than a threshold value, as belonging to the same cell; and
   acquire brightness information of the cell image and recognize a boundary of the individual cells based on the brightness information, and in a case where a boundary region is present on a straight line connecting nucleoli to each other, even if the distance between the nucleoli is equal to or less than the threshold value, the nucleoli are recognized as nucleoli belonging to different cells.

* * * * *